Nov. 24, 1970  E. MARTIN  3,543,148
APPARATUS FOR AUTOMATIC TESTING OF ELECTRICAL DEVICES
BY TESTING THEIR CHARACTERISTIC CURVES
FOR EXCESS OF TOLERANCE ZONES
Filed Dec. 16, 1968

United States Patent Office 3,543,148
Patented Nov. 24, 1970

3,543,148
APPARATUS FOR AUTOMATIC TESTING OF ELECTRICAL DEVICES BY TESTING THEIR CHARACTERISTIC CURVES FOR EXCESS OF TOLERANCE ZONES
Erwin Martin, Munich, Germany, assignor to Siemens Aktiengesellschaft, Siemens-Halske-Werke, Patentabteilung, Munich, Germany
Filed Dec. 16, 1968, Ser. No. 784,137
Int. Cl. G01r 27/00; G02f 1/28; H01j 29/70
U.S. Cl. 324—57                                                      8 Claims

ABSTRACT OF THE DISCLOSURE

Apparatus for automatically testing electrical devices by placing a curve characteristic of the device on a cathode ray screen, shifting the curve to one limit characteristic of a tolerance zone, and detecting excesses of the other limit by the curve. The limits are defined by photosensitive diodes.

GENERAL DESCRIPTION OF THE INVENTION

Processes which change one magnitude in dependence upon another variable magnitude can be made visible in accordance with their characteristic curves traced on the screen of a cathode ray oscilloscope. In such displays, the first magnitude controls deflection of the cathode ray beam in one direction, generally vertically, while the second magnitude controls deflection in the perpendicular direction. The exact location of the curve on the screen can be adjusted through changing a bias potential on the deflection plates, so that the curve can be set to occupy a certain position with respect to a scale, to a cross hatch, or any other marking.

Many two and four terminal devices can be examined with the aid of a characteristic curve traced in such manner, and their properties, faults and the like can be determined from the examination of that curve. For instance, frequency curves of filters and magnetization curves of magnetic cores can be displayed in such fashion. In most cases a tolerance zone is fixed for the individual items to be tested, and the characteristic curves for the individual items must lie within the zone if the item is to pass the test.

So long as measurements or tests are carried out individually, the time spent for the individual tests is not important. Moreover, the probability of error in the test is quite low, by reason of the higher caliber of the personnel who make tests of this kind, and the small number of items to be tested. However, when a large number of sequential measurements are to be carried out, measurements with known techniques become quite difficult. This is particularly true if many items of the same kind and having the same tolerance zone are to be tested, when such items have absolute levels of their characteristic curves which change with the item.

It is an object of the present invention to provide for sequential measurements of this type, by testing items for their properties in as short a time as possible, with great reliability of results. For this purpose the invention provides a circuit arrangement for examination of the path of a characteristic curve of any type, which may be plotted on a screen, with the testing indicating excess of the limits of a tolerance zone.

German published application No. 1,204,862 discloses a circuit arrangement for examination of the path of a characteristic curve, using a threshold value circuit. In this circuit, upon response of the threshold value switch, if the measuring voltage decreases only slightly and for a short period of time as may occur due to harmonic vibration, the switching threshhold is changed and preferably reduced in its absolute amount, so that the instability of the curve does not falsify the value being measured. However, the method can only be used for measuring curves which are tested for excess of only a single limiting value. The technique of the present invention, however is intended for application to a threshhold zone defined by at least two limiting lines. Since these limiting lines can themselves represent curves of any shape, the technique of the German application referred to is not suited for solution of the task of the present invention.

The system of the invention achieves the objective by first shifting the curve plotted on the screen automatically to one limit of the tolerance zone, while preventing indication of excess over the other limit, until the curve registers with or exceeds the first limit. The shifting operation is then stopped, and the invention provides thereafter for detection of excesses of the curve beyond the other limit of the tolerance zone.

The invention has the advantage that the measuring process can be performed very quickly by reason of the completely independent mode of operation. Since the probability of error is very slight when automation is employed, the measuring result is also more reliable than that of individual measurement by humans, and this is particularly so when sequential measurements must be carried out. Human contact with the measurement system of the invention is limited to connection of the items to be tested into the system, and after the testing operation is performed automatically, to evaluation of the test results.

The system of the invention also is adaptable to cooperation with an automatic sorting procedure, so that the items tested can be rejected if their characteristic curves exceed the tolerance zone. Also, the items can be sorted in accordance with the position of the absolute level of the characteristic curve, that is, whether it is high or low.

The invention is usable not only for testing of essentially straight line curves, but also for any other shape for which a pair of threshold value switches cannot supply an accurate enough result. In addition, the circuit of the invention permits examination of frequency curves which may not only have a given tolerance zone of any shape, but also may possess a different absolute level of characteristic curve in accordance with the item to be tested.

The tolerance zone of the measuring system of the invention can be defined by a number of photodiodes. Then, if the curve is traced by a spot of light which is provided by a cathode ray oscilloscope, when the characteristic curve registers with or crosses one or more of these diodes, a signal may be given to a control circuit which thereupon carries out or causes a corresponding reaction. By insertion of several individually usable or connectible diodes, different measures can be effected at different points in the tolerance zone. For example, it is possible to evaluate only certain excesses beyond a tolerance limit, for instance if the tolerance limit in a certain area is exceeded, this may be evaluated as an error only if a second excess is also registered. The location of the excess of the tolerance limit can also be determined more accurately for statistical purposes.

By reason of the fact that the photodiodes can be plugged in or taken out, either the entire diode screen which defines the tolerance zone can be exchanged for another, or only individual diodes can be plugged in to define a different tolerance field.

DETAILED DESCRIPTION OF THE INVENTION

The invention will now be more fully described in conjunction with drawings showing preferred embodiments of the invention. In the drawings, FIG. 1 shows a measuring curve which lies within the tolerance zone;

Figure 1:
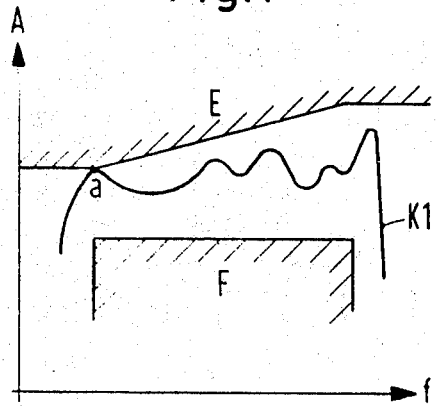

In FIG. 1 the upper limiting line of the tolerance zone is designated E, while the lower limiting line is designated F. The characteristic curve K1 of the satisfactory item being examined, will fit wholly within the tolerance zone defined by the lines E and F.

Figure 2:
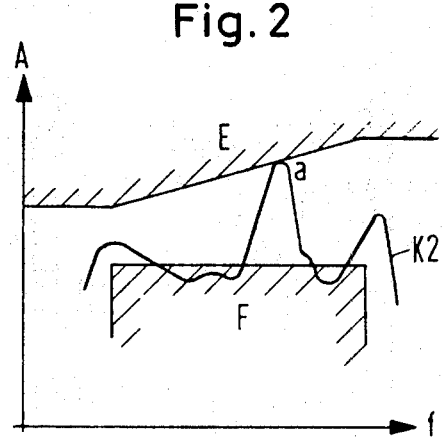
FIG. 2 shows a curve K2 which exceeds the tolerance zone.

In contrast, in FIG. 2, the characteristic curve K2 touches or registers with the upper tolerance line E, but exceeds the lower tolerance line F in a number of positions. It will be appreciated that the absolute level of the characteristic curve itself is of no importance, since of course it will be possible to eliminate the excess beyond the lower tolerance limits F by shifting the curve upwardly. However, the curve would then exceed the tolerance level E by a corresponding amount. Consequently, the item being tested whose characteristic curve corresponds to that shown at K2 is FIG. 2 does not fit the required tolerance zone, and as a consequence the item should be rejected.

Figure 3:
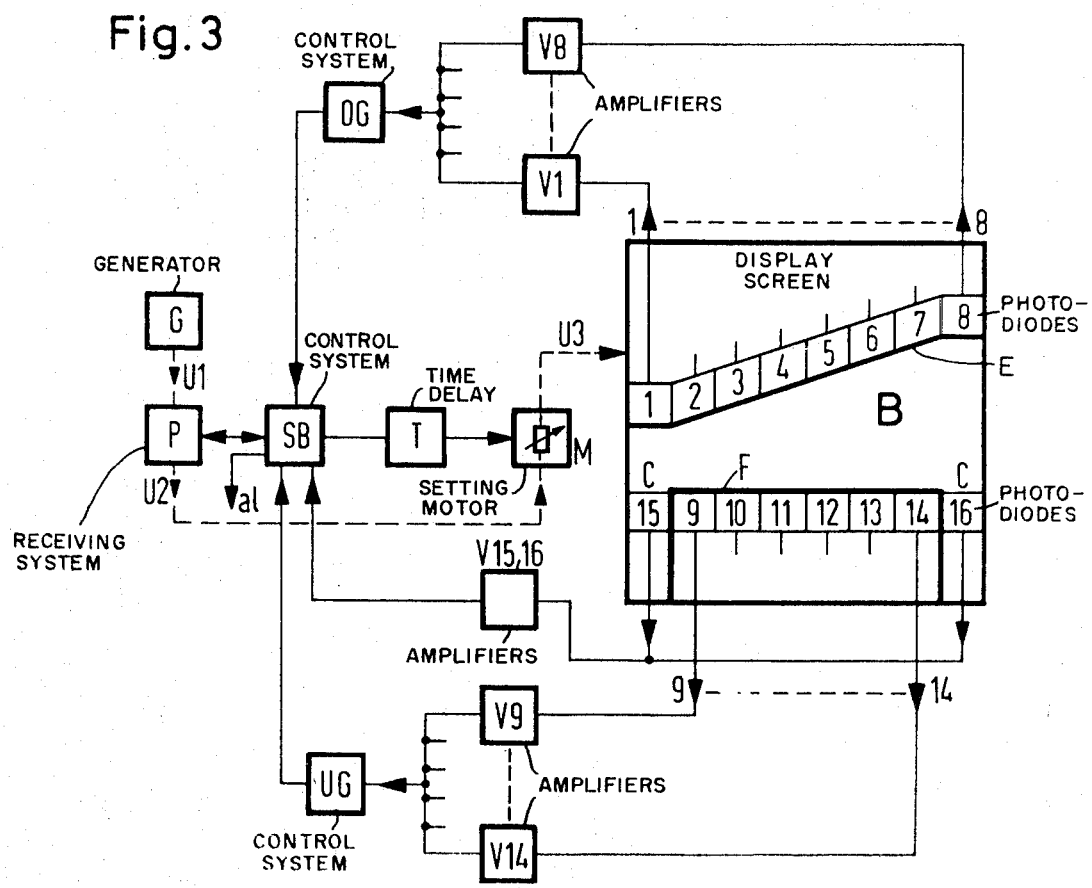
FIG. 3 is a block diagram of a circuit arrangement for automatic testing of the path of a characteristic curve.

FIG. 3 shows a circuit apparatus which automatically provides for shifting of the characteristic curve to the right position with respect to the tolerance zone. In the apparatus of FIG. 3, the upper and lower tolerance limits are defined by photodiodes, with diodes shown in blocks 1–8 representing the upper limit E, and diodes 9–14 representing the lower limit F. The tolerance zone defined by the these photodiodes is formed on the screen of a cathode ray oscilloscope, and the dot of light result from impingement of the cathode ray beam on the screen travels across the picture tube under control of the control system SB.

For the purpose of illustration, it will be assumed that the characteristic curve represents the frequency response of an item to be examined. In such case, as the frequency increases, the light dot is moved on the screen B from left to right. The field of the screen B consequently is drawn only large enough so that the limits of the field represent the limits of the horizontal and vertical deflection of the light spot. After the spot reaches the position corresponding to the highest frequency being considered, the direction of movement of the spot is reversed, so that it traverses the curve with decreasing frequency in reverse direction until it again arrives at the left edge of the screen and the applied frequency is increased again.

It will be appreciated that the system of the invention is not only suited to testing of the frequency response, but also for testing with all other variable magnitudes, including time, which may cause shifting of the dot of light of spot from left to right and return. Depending upon the properties of the item to be tested, the light spot is then deflected perpendicularly to the left to right direction of motion. Control of this vertical deflection can ordinarily be accomplished with the aid of an adjusting knob. However, the control means SB is so constructed that this vertical change may also be effected with the aid of the setting motor M or corresponding electronic shifting circuit.

In operation of the system of FIG. 3, an item to be tested as to frequency response is placed in the receiving system P which contains the necessary terminals to provide the variable frequency input voltage U1 from the generator G. The behavior of the item with changing frequency is then recorded on the screen B with the aid of the voltages labeled U2 and U3. The path of the signal is shown in FIG. 3 by a dotted line. The circuit apparatus is so designed that the absolute limit of the characteristic curve is initially shifted to the upper tolerance limit E. For this purpose, at the start of the measuring process, the curve is first shifted rapidly to the lower tolerance limit F, so as for instance to exceed or to register with the limit C formed by diodes 15 and 16 at the extremities of limit F. Signals from photodiodes 15 and 16 are processed by amplifiers V15 and V16 and communicated to control system SB which acts on UG to prevent signal transmission therefrom. After such interception of the limit C, the curve is then shifted upwardly following each traverse of the frequency spectrum by a small step. Thereby, the characteristic curve is moved toward the upper tolerance limit E until the maximum excursion of this curve registers with one of the photodiodes 1–8.

That photodiode which reacts to registration of the curve with the upper limit, then provides an impulse over the associated amplifier V1–V8, to control system OG. The control system OG then stops the shifting motor M and simultaneously releases the control system UG associated with the lower limit of the tolerance zone, so that pulses obtained from photodiodes 9–14 can be recognized and evaluated.

The subsequent measurement time period can extend over one or several passages of the system through the frequency spectrum of the voltage U1 supplied to the device being tested. If one of the photodiodes 9–14 is then touched or crossed by the light spot during this measurement period, the recorded characteristic curve is evaluated as being within the tolerance zone, and a corresponding signal is provided on the line $a1$. This signal may actuate an acoustical or optical indicator. Moreover, it can also cause operation of a sorting system to classify automatically the item being tested with those circuit devices already tested and found to be satisfactory.

However, if one of the photodiodes of the lower tolerance limit F is touched by the light spot, a pulse is provided over one of amplifiers V9–V14 to control system UG. The control system SB then provides a different signal over line $a1$ to actuate a different indicator and identify this item as unsatisfactory. If the sorting system is associated with the apparatus of FIG. 3, the response may also cause rejection of the involved item.

By the use of a further series of photodiodes, the testing system can be modified in such way as for instance to recognize extremely narrow portions of the characteristic curve which exceed the upper tolerance limits, and to avoid rejecting items causing such curves.

As indicated above, the photodiodes are preferably so constructed as to be plugged in at different locations on the screen, so that the tolerance zone can be arranged differently for subsequent measuring operations. For this purpose, the entire tolerance zone may be arranged on a compact frame and the frame as well as the photodiodes can be exchanged. However, it is also possible to plug the photodiodes individually into an appropriate screen.

The above-described example of the invention provides for adjusting the absolute level of the characteristic curve upwardly, from a low value. However, the circuit apparatus can also be arranged in such way that the absolute value of the preceding measurement serves as the starting value for the next item to be tested. In such case, however, the characteristic curve at the beginning of the testing operation may cross the upper limit of the tolerance zone E, rather than the lower limit. In such case, the absolute level must be lowered so that none of the photodiodes 1–8 is crossed by the light spot. Then the step-by-step shifting to the upper limit of the tolerance zone takes place as previously described. In such fashion, it is possible to let the setting motor M operate at first rapidly, and to operate slowly only close to the end point switch.

It is of course desirable that operation of the setting motor M is prevented following the initial shifting of the curve to contact with the upper measuring limit E, until a complete trace of the curve is effected. For this purpose, the time delay link T is connected between the control system SB and the setting motor M. It may then be provided that the light spot be directed to the zero axis whereupon the control system SB may be prevent further pulses from being processed by the diode amplifiers V1–V14, until the test item is replaced by another one.

The sorting of the items being tested can additionally be carried out according to other criteria. The last position of the setting motor in each testing operation is an indication of the absolute level to which the characteristic curve was brought in the last measuring operation. If these indications are conveyed to the sorting system, such values can be also utilized as criteria for sorting.

It will be appreciated that many other changes could be made in the apparatus specifically described herein without departure from the scope of the invention. Therefore, the invention is not to be considered limited to the specific embodiment described herein, but rather only by the scope of the appended claims.

What I claim is:

1. Apparatus for plotting the characteristic curve of an electrically tested element and for indicating when the distance on said curve between points of maximum and minimum deflection thereon exceeds a predetermined magnitude comprising:

a display means (B) including means (U3) for plotting thereon a curve corresponding to the electrical response of said tested element, responsive means (1–16) placed in a position relative to the said display means for producing an electrical signal when a portion of said curve impinges thereon, said responsive means forming variably spaced apart lines extending along one of the ordinate and abscissa of said display means, the distance between said spaced apart lines corresponding to said predetermined magnitude.

means for shifting (SB, M) said curve on said display means until one of said points of maximum and minimum deflection impinge upon one of said lines of responsive means, first indicating means (UG) responsive to the impingement of the other of said points of maximum and minimum deflection on the other of said lines of responsivce means and second indicating means (OG) responsive to the impingement of said one of said maximum and minimum points of deflection on said one line of responsive means for preventing said indicating means from indicating until said one point on said curve impinges on said one line.

2. The apparatus of claim 1 in which said curve is traced by a light spot and said lines of responsive means are defined by photosensitive devices connected to said first and second indicating means (UG, OG).

3. The apparatus of claim 2 in which said lines of responsive means are lines defined by photo diodes.

4. The apparatus of claim 3 including interception diodes (15, 16), defining the extreme limits of said other line, and said shifting means is operable first to shift the curve rapidly to register with one of said interception diodes and then to shift it relatively slowly to said line.

5. The apparatus of claim 1 in which said shifting means is operable first to shift the curve rapidly to said other line and then to shift it relatively slowly to said one line.

6. The apparatus of claim 1 in which the curve is traced by a cathode ray beam.

7. The apparatus of claim 1 in which said curve is traced repetitively and said shifting means shifts the curve, by small steps following each completion of the curve.

8. The apparatus of claim 7 in which the curves are responsive to changes in measured output from the item being tested in response to variation in input over a range, and including means (T) for preventing shift of the curve for at least one variation in input, over said range following registration of the curve with said one limit.

References Cited

UNITED STATES PATENTS

| 2,717,329 | 9/1955 | Jones et al. | 315—24 |
| 2,977,499 | 3/1961 | Bockemuehl | 250—217 X |
| 3,189,780 | 6/1965 | Takagi et al. | 250—217 X |
| 3,405,311 | 10/1968 | Brainard et al. | 315—19 |

EDWARD E. KUBASIEWICZ, Primary Examiner

U.S. Cl. X.R.

250—217; 315—19